Oct. 30, 1951 M. CAMRAS 2,572,985

AUTOMATIC STOP FOR MAGNETIC RECORDERS

Filed Feb. 18, 1946 2 SHEETS—SHEET 1

Inventor
Marvin Camras by The Firm of Charles W. Hills Attys

Oct. 30, 1951 M. CAMRAS 2,572,985

AUTOMATIC STOP FOR MAGNETIC RECORDERS

Filed Feb. 18, 1946 2 SHEETS--SHEET 2

Inventor
Marvin Camras
by The Firm of Charles Hill Attys

Patented Oct. 30, 1951

2,572,985

UNITED STATES PATENT OFFICE 2,572,985

AUTOMATIC STOP FOR MAGNETIC RECORDERS

Marvin Camras, Chicago, Ill., assignor to Armour Research Foundation of Illinois Institute of Technology, Chicago, Ill., a corporation of Illinois Application February 18, 1946, Serial No. 648,425

8 Claims. (Cl. 242—54)

This invention relates to an automatic stop for magnetic recording and reproducing devices, as well as for other winding and reeling apparatus which handles relatively fine thread-like material, and which is equipped with a suitable leader at its end.

One of the problems which is met with in handling relatively fine wire or other thread-like media in any winding and reeling mechanism is the problem of automatically stopping the winding and reeling apparatus at the end of a winding and reeling operation. Any automatic stop mechanism should be positive, direct acting, and yet, at the same time, be relatively economical to manufacture. This problem is particularly important in magnetic recording and reproducing devices using an elongated record medium, since it is extremely important that the cost of the record itself be kept at a minimum.

It is one of the principal features and objects of the present invention to provide a novel automatic stop for any winding and reeling mechanism arranged to handle an elongated member.

It is a further object of the present invention to provide a novel automatic stop mechanism which is positive and direct in its action, which is substantially foolproof, which is relatively inexpensive, and which is rugged and reliable in use.

Another object of the present invention is to provide a novel automatic stop for magnetic recording and reproducing devices of the type employing a wire or other thread-like medium having a leader with either one or both of its edges notched or otherwise provided with a series of tongues.

Still another object of the present invention is to provide an automatic stop for winding and reeling mechanisms which will act irrespective of the direction of movement of the elongated medium through the device.

Still another and further object of the present invention is to provide automatic stop mechanism and means for magnetic recording and reproducing devices which includes means for readily and quickly resetting the stop mechanism after it has been actuated.

The novel features which I believe to be characteristic of my invention are set forth with particularity in the appended claims. My invention itself, however, both as to its organization, manner of construction and method of operation, together with further objects and advantages thereof, may best be understood by reference to the following description, taken in connection with the accompanying drawings, in which:

Figure 1:
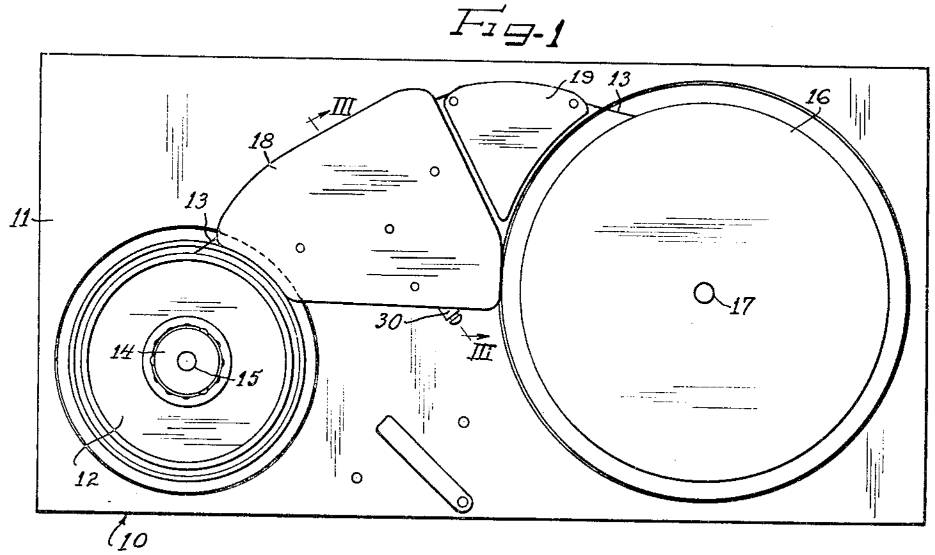
Figure 1 is a plan view of a magnetic recording and reproducing device which is equipped with automatic stop mechanism embodying the novel features and characteristics of the present invention.

Referring first to Figure 1 of the drawings there is illustrated therein the top panel 11 of a recording and reproducing device 10 upon which the winding and reeling mechanism is mounted. The takeoff spool 12, upon which the wire 13 is normally stored, is mounted for rotation with the hub 14 carried by the shaft 15. On the opposite side of the device 10 is located a relatively large takeup spool 16 which is mounted for rotation on the shaft 17. The particular means for rotating the shafts 15 and 17 forms no part of the present invention, and for that reason has not been illustrated. It will simply be necessary to understand that when the wire 13 is being transferred from the spool 12 to the spool 16, the shaft 17 is driven in a clockwise direction and some suitable drag is placed on the shaft 15 so as to maintain a certain amount of tension in the wire 13 at all times. It will also be understood that when the wire 13 is to be returned from the takeup spool 16 to the storage spool 12 the shaft 15 is driven in a counterclockwise direction and a suitable drag is placed upon the shaft 17 to maintain tension in the wire 13.

The wire 13, in passing from the spool 12 to the spool 16, passes through the stop mechanism 18 and then through a recorder head 19. The problem which is here solved involves the automatic stopping of the drive mechanism for the shafts 15 and 17 when the end of the wire 13 passes through the stop mechanism 18, irrespective of which direction the wire is traveling.

Figures 2, 9:
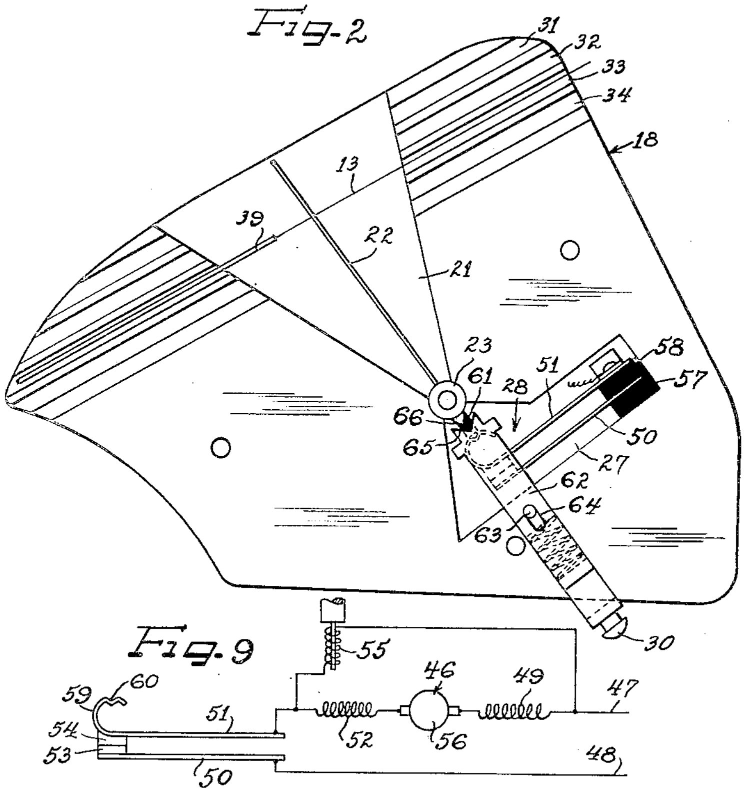
Figure 2 is an enlarged plan view of the stop mechanism employed in the recording and reproducing device of Figure 1 with the top plate removed.
Figure 9 is a schematic wiring diagram of the stop mechanism switch in the energizing circuit of the motor which drives the winding and reeling mechanism.
Figure 3:
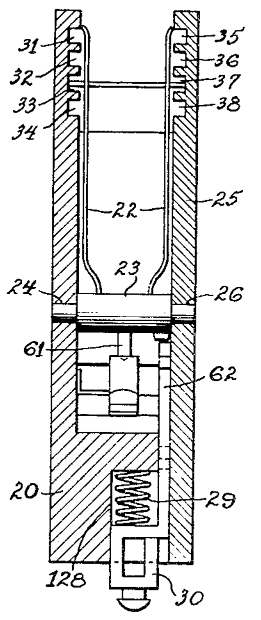
Figure 3 is a sectional view through the stop mechanism which shows parts in elevation, as taken along the line III—III of Figure 1.

Referring now particularly to Figures 2 and 3 of the drawings, the stop mechanism 18 is illustrated in detail therein. This stop mechanism 18 includes a relatively thick base plate 20 which has a large V-shaped recess 21 therein in which a pair of trip fingers 22 are mounted for angular movement about a pin 23 which is journaled in the base 20 as at 24, as well as in a cover plate 25, as at 26.

The base member 20 is also recessed as at 27 for mounting of the switch mechanism 28, presently to be described. The base 20 is still further recessed as at 128 to receive a small helical spring 29 and a portion of the recessed arm 30.

The base 20 may conveniently be in the form of a casting, and in addition to the recesses just described, preferably includes a plurality of channels 31, 32, 33 and 34 which are parallel disposed and extend from one side of the base 20 to the other substantially at right angles to the trip fingers 22 when they are disposed in a central position in the V-shaped recess 21. The cover plate 25 is provided with a similar set of grooves 35, 36, 37 and 38, which are disposed directly opposite grooves 31, 32, 33 and 34 respectively. The grooves 31 to 38 are for the purpose of confining the leader 39 within the upper portion of the stop mechanism as it passes between the fingers 22. This leader 39 (see Figure 8) is in the form of an elongated strip having a plurality of notches 40 cut therein along the two longitudinal edges thereof, and is provided with a tapered end 41 adjacent the end of the wire. The end of the wire 13 is bent through first one hole 42 and then back through another hole 43 in this tapered end portion 41 of the leader 39.

The end of the wire 13 may be conveniently held in place by a piece of tape 44 having a pressure-sensitive adhesive thereon. The leader 39 is slightly wider than the spacing between the two end walls of the spool 12 or the spool 16 and it will therefore be understood that the tongues 45 formed by the notches 40 make a resilient frictional engagement with the side walls to hold the leader securely in place. It has been found that no other securing means is required.

This particular method and means of securing the end of a wire to a spool is described and claimed in my copending application entitled "Leader for Magnetic Recorder Medium, and Method of Making Same," U. S. Serial No. 638,497, filed December 29, 1945, and assigned to the same assignee as the present invention.

It is to be understood that a leader such as the leader 39 is secured to the inner end of the wire 13 as well as the outer end of the wire 13. It will thus be apparent that when the end of the wire 13 is reached in the winding and reeling operation one of these leaders will pass between the pair of fingers 22, irrespective of which direction the wire is traveling (since there is a leader at both ends).

The grooves 33 and 37 are arranged to normally confine the leader as it passes through the automatic stop mechanism 18. The additional grooves are provided in case different size spools are used for the takeoff spool 12 and as additional safety means in case the leader should slip out of the normal pair of guide grooves.

As will now be described, the passage of the leader 39 between the pair of fingers 22 causes a rocking movement of these fingers about their pivot points 24 and 26 and this rocking movement is utilized to cause deenergization of the motor or other driving means which operates the winding and reeling mechanism.

As is diagrammatically illustrated in Figure 9 of the drawings, the energizing circuit of the winding and reeling motor 46 includes a pair of power supply conductors 47 and 48. The power supply conductor 47 is connected to a field winding 49 of the motor 46 and the power supply conductor 48 is connected through a pair of leaf-spring contact arms 50 and 51 to the other field winding 52 of the motor 46. The leaf-spring contact arms 50 and 51 include contact buttons 53 and 54. Merely by way of diagrammatic illustration, other control mechanism, such, for example, as a solenoid operated brake, might also be controlled through this same energization circuit. Such a solenoid operated brake is diagrammatically illustrated by the coil 55 which is connected in shunt across the motor 46.

The field coils 49 and 52 of the motor 46 are shown as being connected in series with the armature 56. It is to be clearly understood that the electrical control circuit per se forms no part of the present invention, for the invention is confined to the automatic stop mechanism, which includes means for opening or otherwise changing the condition of energization of any control circuit through the opening and closing of the contacts 53 and 54.

The contact arms 50 and 51 of the switch 28 are mounted on insulating blocks 57 and 58 within the recess 27 of the base 20. It will be noted that the leaf-spring contact arm 51 has a curled end 59 which extends around in substantially a closed circle. The top of this curled portion 59 has a depressed portion 60 therein which normally extends into engagement with a small depending pin 61 of insulating material rigidly secured to the shaft 23. The leaf-spring arm 51 normally tries to lift up away from the lower arm 50, and for that reason it will be apparent that the depressed portion 60 on the arm 51, with the pin 61 on the shaft 23, normally holds the trip fingers 22 in their central position as shown in Figure 2 of the drawings.

Figures 4, 5, 6, 7, 8:
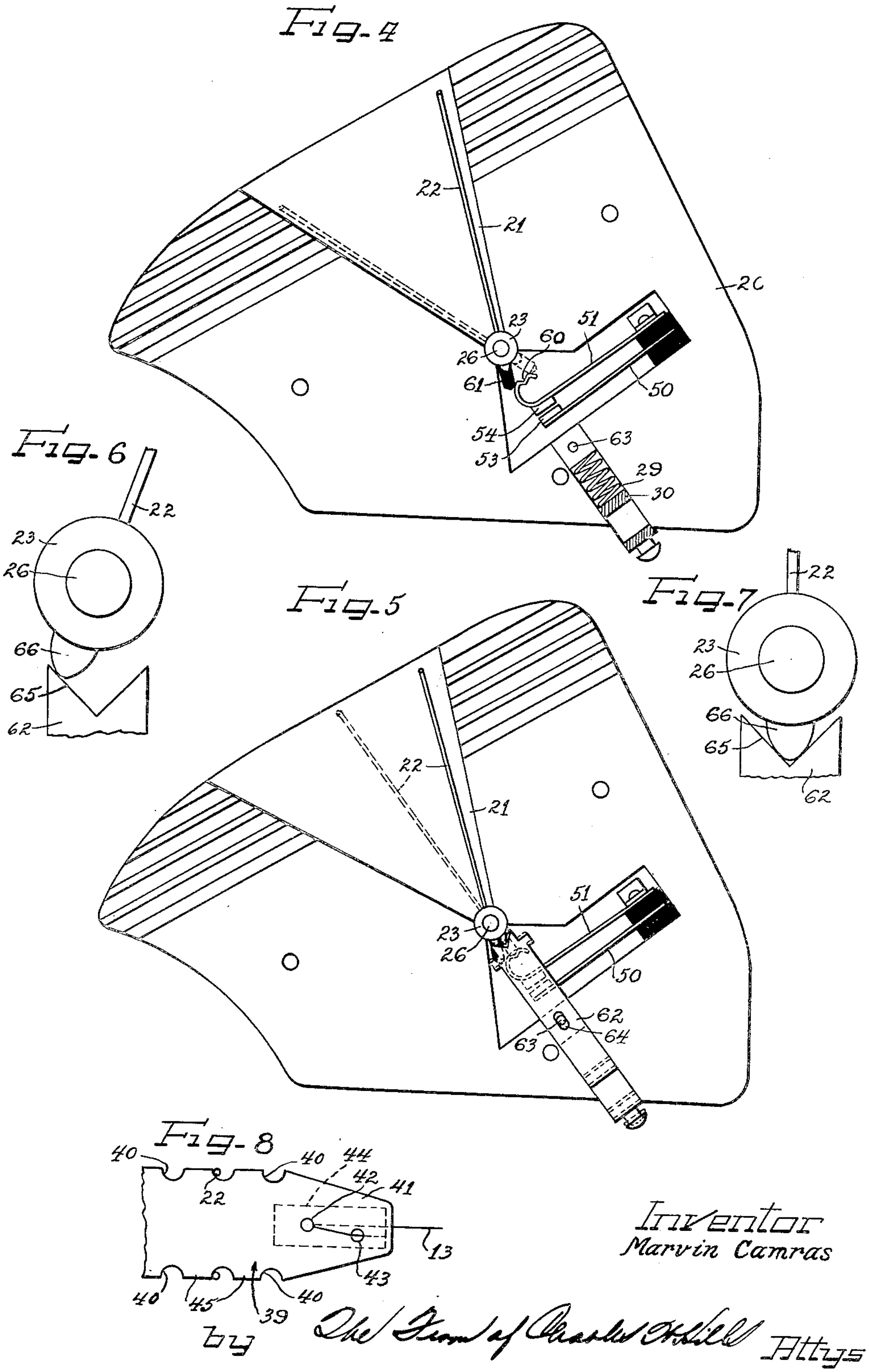
Figure 4 is a view similar to Figure 2 but with the stop mechanism in its tripped position.
Figure 5 is a view similar to Figures 2 and 4 illustrating the resetting operation.
Figure 6 is a greatly enlarged fragmentary view of the resetting arm in a position about to return the trip finger to its normal position.
Figure 7 is a view similar to Figure 6 showing the position of the resetting mechanism immediately following the movement of the trip finger of the stop mechanism to its normal position.
Figure 8 is a fragmentary view of a portion of the leader on the end of the wire or other thread-like medium which is being handled by the winding and reeling mechanism.

As the wire 13 moves from left to right, as viewed in Figure 2 of the drawings, it finally reaches the position where the leader 39 strikes the trip fingers 22. Since the tongues 45 on the leader 39 are farther apart than the spacing between the trip fingers 22, the trip fingers 22 will be grasped by the projections 45 (see Figure 8) and the fingers will be rocked to the side of the recess 21 against the action of the resilient biasing force produced by the arm 51. This is shown in Figure 4 of the drawings by the full line position of the trip fingers 22. In moving to the position as shown by the full line in Figure 4, it will be observed that the contact arm 51 is released upwardly, thus separating the contacts 53 and 54. This, in turn, opens the energizing circuit to the motor driving the winding and reeling mechanism and automatically stops the operation thereof. Usually enough momentum is involved in the drive mechanism of the winding and reeling device so that the leader be carried by the rotation of take-up spool 16 beyond the mechanism 18 and will be wrapped about the take-up spool 16.

However, it may be desirable to stop the mechanism before the leader comes off the winding spool. This may be accomplished by making the leader sufficiently longer, or by employing a fast acting brake which may be operated by suitable control mechanism such as mechanism 55 in Figure 9.

The reset mechanism includes the reset arm 30 which is slidably mounted in the recess 28 of the base 20. This reset arm 30 includes a finger 62 which extends up into a position just short of the shaft 23 upon which the trip fingers 22 are mounted. The trip finger is confined to limited movement toward and away from the shaft 23 by a guide pin 63 which extends through a slot 64 in the finger 62, as well as by the walls of the recess 28. The finger 62 of the recessed arm 30 is normally biased to its lower position by the coil spring 29. The upper end of the finger 62 has a curved or V-shaped cut out portion 65 therein which is located under a small protuberance 66 on the shaft 23. In the normal position of operation of the device (as shown in Figure 2) the finger 62 is biased to its lower position by the spring 29 and the curved cut out tip 65 is spaced from the protuberance 66. After the leader 39 has tripped the fingers 22 and moved them to one side of the V-shaped recess 21 the protuberance 66 is still within the confines of the notched out tip 65 but over to one side thereof. If the recessed arm 30 is now pushed upwardly against the action of the spring 29, the curved tip 65 of the finger 62 engages the protuberance 66 and causes the same to ride down to the bottom of the groove (as may be seen in Figures 6 and 7, the latter being the position of the protuberance 66 after the recessed arm 30 has been moved up as far as it will go).

After the protuberance 66 has been advanced to the position as shown in Figure 7, the depending pin 61 on the tripped finger shaft 23 has again become engaged in the depressed portion 60 of the spring arm 51. The recessed arm may now be released and the trip fingers 22 will again be held in their normal central position as shown in Figure 2 of the drawings.

If the wire 13 is now to be rewound onto the spool 12 the leader is wrapped around the drum (not shown) of the spool 12, and the wire 13 positioned in the head 19 and through the automatic stop mechanism 18. The shaft 15 is then rotated in a counter-clockwise direction to wind the wire 13 onto the spool 12. After the wire 13 has been wound onto the spool 12 the leader, which was originally wrapped around the drum of the spool 16, will pass between the trip fingers 22 and move into the position as shown by the dotted lines in Figure 4. This likewise releases the spring arm 51 and causes separation of the contacts 53 and 54 to open the energization circuit of the winding and reeling motor 46.

While the level-wind mechanism does not form a part of the present invention, it will be noted that the spacing of the trip fingers 22 is such as to in nowise interfere with any sort of a level winding operation. One particular manner in which the wire 13 may be level-wound is to cause movement of the head 19 toward and away from the panel 11.

From the above description, it will be apparent that I have described a particularly efficient and economical automatic stop mechanism for winding and reeling mechanisms handling wire or other thread-like media. It will, of course, be equally well understood that such trip mechanism may be used for winding and reeling tape or other elongated media by providing a leader, such as the leader 39, for effecting the tripping operation of the trip fingers 22. In this connection it is to be observed that the wire itself does not directly operate the automatic stop mechanism, but rather the leader secured to the end of the wire does, and hence the specific nature of the elongated medium which is to be handled by the winding and reeling mechanism may vary within wide limits without departing from the spirit and scope of the present invention. It will furthermore be observed that the medium may indeed be in the form of an elongated strip of material, such as the leader 39, provided that the edge of the elongated material is so dimensioned or arranged that when the end thereof passes between the trip fingers 22 it will rock the same to either of their two extreme positions.

While I have shown a particular embodiment of my invention, and have described a particular method of operation, it will, of course, be understood that I do not wish to be limited thereto, since many modifications may be made, and I, therefore, contemplate by the appended claims, to cover all such modifications as fall within the true spirit and scope of my invention.

I claim as my invention:

1. In winding and reeling apparatus for wire having a leader of resilient strip material secured to an end thereof, said strip having a plurality of projecting teeth along at least one of its longitudinal edges, automatic stop mechanism comprising a pair of spaced fingers through which the wire travels, said fingers being mounted for movement about an axis lying in a plane transverse to the path of travel of the wire between said fingers, the overall width of said leader, including said teeth, being slightly greater than the spacing between said fingers, means normally biasing said fingers to one position, whereby when said teeth engage a finger as said leader tries to pass between said fingers, said fingers are rocked from said one position to a second position, and means responsive to rocking movement of said fingers for stopping said winding and reeling apparatus.

2. In winding and reeling apparatus for wire having a leader of strip material substantially wider than the wire and secured to an end thereof, automatic stop mechanism comprising a pair of fingers spaced a distance greater than the thickness of said wire and between which the wire travels, the width of said leader being slightly greater than the spacing between said fingers, means engaging opposite sides of said leader and guiding said leader to said fingers, said fingers being mounted for movement about an axis lying in a plane transverse to the path of travel of the wire between said fingers, yieldable means normally biasing said fingers to one posiiton whereby when said leader is reached and tries to pass between said fingers said fingers are rocked from said one position to a second position, means responsive to said rocking movement of said fingers for stopping said winding and reeling apparatus, and means for resetting said fingers to said first position.

3. In winding and reeling apparatus for wire having a leader of strip material secured to each end thereof, automatic stop mechanism for stopping said winding and reeling mechanism when either end of said wire is reached during a winding or rewinding operation comprising a pair of spaced fingers through which the wire travels, the width of each of said leaders being slightly greater than the spacing between said fingers, said fingers being mounted for movement about an axis lying in a plane transverse to the path of travel of the wire between said fingers, means normally biasing said fingers to an intermediate position whereby when one of said leaders strikes said fingers, said fingers are rocked in one direction to a second position, and when said fingers are engaged by said other leader, said fingers are rocked in the other direction to a third position, and means responsive to rocking movement to either of said second or third positions for stopping said winding and reeling apparatus.

4. In winding and reeling apparatus for an elongated member having an end portion thereof of strip material, automatic stop mechanism comprising a pair of spaced plate portions having a confronting series of grooves therein disposed parallel to the path of travel of said elongated member to define a plurality of tracks to receive said end portion of said member, a pair of trip fingers mounted between said plate portions, one finger being in close proximity to one plate portion and the other finger being in close proximity to the other plate portion and being spaced apart a distance slightly less than the overall width of said end portion of said elongated member, said fingers being normally biased to one position and then movable to a second position to stop said winding and reeling apparatus when said end portion of strip material of said elongated member strikes said fingers.

5. In winding and reeling apparatus for an elongated member having an end portion thereof of strip material, automatic stop mechanism comprising a pair of spaced plate portions having a confronting series of grooves therein disposed parallel to the path of travel of said elongated member to define a plurality of tracks to receive said end portion of said member, a pair of trip fingers mounted between said plate portions, one finger being in close proximity to one plate portion and the other finger being in close proximity to the other plate portion and being spaced apart a distance slightly less than the overall width of said end portion of said elongated member, said fingers being normally biased to one position and then movable to a second position to stop said winding and reeling apparatus when said end portion of strip material of said elongated member strikes said fingers, means normally biasing said trip fingers to said first position where they are disposed generally transverse to the path of movement of said elongated member.

6. In winding and reeling apparatus for an elongated member having an end portion thereof of strip material, automatic stop mechanism comprising a pair of spaced plate portions having a confronting series of grooves therein disposed parallel to the path of travel of said elongated member to define a plurality of tracks to receive said end portion of said member, a pair of trip fingers mounted between said plate portions, one finger being in close proximity to one plate portion and the other finger being in close proximity to the other plate portion and being spaced apart a distance slightly less than the overall width of said end portion of said elongated member, said fingers being normally biased to one position and then movable to a second position to stop said winding and reeling apparatus when said end portion of strip material of said elongated member strikes said fingers, means normally biasing said trip fingers to said first position where they are disposed generally transverse to the path of movement of said elongated member, and means for restoring said trip fingers from said second position to said first position.

7. In winding and reeling apparatus for an elongated member having an end portion thereof of strip material, automatic stop mechanism comprising a trip finger in close proximity to which said elongated member travels, said trip finger being pivotally mounted at a point spaced laterally from the normal path of travel of said elongated member and said finger extending toward and past said elongated member, said finger having a depending tooth on the opposite side of its pivot point from the portion extending toward said elongated member, a leaf-spring movable contact member disposed substantially at right angles to said finger and below said depending tooth, the end of said leaf-spring being curled toward said tooth through approximately three-quarters of a circle and lying immediately under said depending tooth, said portion lying immediately under said depending tooth having a detent therein in which said depending tooth is normally seated, a second leaf-spring contact member below said first leaf-spring and in electrical contact therewith when said depending tooth is seated in said detent, and cooperating means between said end portion of said elongated member and said trip finger for angularly moving said trip finger to rock said depending tooth out of said detent, whereby said first leaf-spring contact member is free to separate from said second leaf-spring contact member.

8. In a winding and reeling apparatus for wire having a leader of resilient strip material secured to an end thereof, said strip having a finger cooperating means along at least one of its longitudinal edges, an automatic stop mechanism comprising at least one elongated finger past which the wire travels in close proximity, said finger being mounted for movement about an axis lying in a plane transverse to the path of travel of the wire along said finger, the over-all width of said leader as compared to the spacing of said wire from said finger, including said finger cooperating means, being sufficiently great to engage said finger, means for directing said leader in a direction substantially normal to the finger, means normally retaining said finger in one position, whereby when said finger cooperating means engage said finger as said leader tries to pass said finger, said finger is moved from said one position to a second position, and means responsive to the movement of said finger for stopping said winding and reeling apparatus.

MARVIN CAMRAS.

REFERENCES CITED

The following references are of record in the file of this patent:

UNITED STATES PATENTS

| Number | Name | Date |
|---|---|---|
| 875,609 | Parkes | Dec. 31, 1907 |
| 909,414 | Hytten | Jan. 12, 1909 |
| 2,151,629 | Wallis | Mar. 21, 1939 |

FOREIGN PATENTS

| Number | Country | Date |
|---|---|---|
| 426,449 | Great Britain | Apr. 3, 1935 |